3,326,286
OIL RECOVERY IN WATER FLOODING
Robert R. Harvey, Bartlesville, Okla., assignor to Phillips Petroleum Company, a corporation of Delaware
No Drawing. Filed Apr. 19, 1965, Ser. No. 449,307
10 Claims. (Cl. 166—9)

This invention relates to an improved process for producing oil from an oil-bearing stratum by aqueous fluid drive utilizing surfactants in the aqueous fluid.

The production of oil by aqueous fluid drive (water flooding or steam flooding) utilizing surfactants in the aqueous fluid is a proposed process for field operation. In such a process the amount of surfactant which must be used usually exceeds the concentration needed to be effective by several orders of magnitude. The reason lies in the fact, that the stratum, as a zeolite, attracts the surfactant from the aqueous carrier rather rapidly. This builds up the concentration of surfactant in the immediate vicinity of the injection well, leaving the carrier liquid substantially stripped and incapable of treating deeper parts of the stratum. The equilibrium which is established

[additive dissolved in carrier⇔
additive adsorbed by formation]

initially lies far to the right since the concentration of surfactant on the formation is substantially zero and since the liquid carrier (water) does not form any strong attractive bond with the surfactant. Yet the amount of surfactant needed to accomplish the purpose, such as wetting, is much smaller than that needed to establish the equilibrium.

This invention is concerned with a process for increasing the utility and effectiveness of non-ionic surfactants in aqueous fluid drive processes as applied to the recovery of oil from an oil-bearing stratum.

Accordingly, an object of the invention is to provide an improved aqueous fluid drive process for recovering oil from an oil-bearing stratum utilizing non-ionic surfactants. Another object is to improve the economics of water flooding operations in which non-ionic surfactants are incorporated in the injected water. A further object is to improve the utility and efficiency of surfactants in an aqueous fluid drive process utilizing the surfactants in solution therein. An additional object is to provide a method of decreasing the permeability of an underground stratum up to and including plugging thereof to fluid flow under reasonable pressures. Other objects of the invention will become apparent to one skilled in the art upon consideration of the accompanying disclosure.

A broad aspect of the invention comprises injecting into an oil-bearing stratum thru a well therein an aqueous slug containing a non-ionic surfactant in solution therein in substantial and effective concentration, such as in the range of 0.001 to 2.5 weight percent, and also containing suspended dead cells selected from the group consisting of bacteria and yeasts in a concentration in the range of 0.01 to 0.5 weight percent; and driving the aqueous slug into the stratum away from the injection well so as to displace oil from the stratum. The aqueous slug is then either driven on thru the stratum toward an offset production well or the pressure on the injection well is reduced so that the slug and displaced oil move back to the injection well under the force of the stratum pressure. In either case the displaced oil is forced into a well for production therefrom by conventional means, such as by pumping. When the process is applied to a single well, the slug injection, aqueous drive, and release of pressure steps are repeated in this sequence until the procedure is no longer economical. The preferred method comprises driving the injected slug with a suitable driving fluid such as water, steam, or a suitable gas such as air or combustion gas, to one or more offset wells lying in a ring pattern around the injection well or in parallel lines of production wells on opposite sides of the injection well or a line of injection wells.

Another embodiment of the invention comprises injecting an aqueous slug of surfactant and suspended carrier cells into a stratum and contacting the slug with brine therein so as to deposit a substantial portion of the dead carrier cells within the stratum, thereby decreasing the permeability of the stratum in the contact area. This procedure is used to decrease fingering and to counteract water and gas coning as disclosed in my copending application S.N. 443,674, filed Mar. 29, 1965, using other plugging agents.

The concentration of surfactant in the injected aqueous solution generally lies in the range of 0.001 to 2.5 weight percent, preferably 0.01 to 0.1 weight percent of the slug. The concentration of the dead cells is generally in the range of 0.01 to 0.5 weight percent, preferably, 0.08 to 0.15 weight percent of the aqueous slug. A concentration of the surfactant of 0.06 weight percent and a concentration of the carrier cells of 0.1 weight percent have been found to be highly efficient in displacing oil from an oil sand.

The amount of slug injected generally lies in the range of 0.1 to 1.0 pore volume, although lesser and greater amounts of the slug containing suspended dead cells and surfactant may be utilized, depending upon the pore size, pore character, and general environment of the oil-bearing stratum being produced. After injecting the slug, the driving medium, preferably water, is injected and the slug is driven thru the stratum as described above.

It has been surprisingly found that dead cells of bacteria and/or yeasts function efficiently in carrying the non-ionic surfactants described herein thru the stratum remote from the injection well as give up the surfactant gradually so as to distribute same more efficiently and economically in the stratum. Apparently, the dead cells are capable of adsorbing substantial amounts of the surfactant from the suspending solution and when injected in the aqueous slug carry the surfactant into the stratum, giving up considerably less of the surfactant to the ambient rock or sand adjacent the injection well than is the case when the cells are omitted from the injected slug. In this manner, the amount of surfactant dissolved in the aqueous slug is considerably more effective than it would otherwise be, giving up the surfactant gradually as the cells move thru the portion of the stratum around the injection well and distribute the surfactant over a much greater area of sand or rock and to a greater depth in the stratum from the injection well.

The invention is applicable to all types of bacteria but non-pathogenic bacteria are preferred for reasons of health. Likewise, all types of yeast cells function effectively as carriers in the invention. Classes of bacteria and yeast families are set forth below:

Bacteria

Members of class: Schizomycetes
    Sub-class A: Algobacteria
        Order #1: Micrococcales
            Family #1: Micrococcaceae
        Order #2: Pseudomonadeles
            Family #1: Pseudomonadaceae
            Family #2: Serratiaceae
    Sub-class B: Eubacteria
        Order #1: Aerobacteriales
            Family #1: Aerobacteriaceae
    Sub-class C: Mycobacteria
        Order #1: Bacillales
            Family #1: Bacillaceae
            Family #2: Clostridiaceae

Yeast

Members of Order: Saccharomycetales
- Family #1: Endomycetaceae
- Family #2: Schizosaccharomycetaceae
- Family #3: Saccharomycetaceae
- Family #4: Torulopsidaceae
- Family #5: Rhodotorulaceae A number of non-ionic surface active agents or surfactants which are water soluble are readily available from commercial sources. Hydrophylic (or lyophylic) agents attracted to the water phase are most desirably employed. Exemplary non-ionic agents are those obtained by reaction of a hydrophobic hydroxy compound such as a phenol or alcohol with several moles of an alkylene oxide principally ethylene oxide or propylene oxide. Water solubility increases with the number of moles of the alkylene oxide reacted. Such reaction products from oleyl alcohol, alkylated-B-naphthol, alkyl phenol such as nonylphenol, may be mentioned as exemplary. Similarly alkylene oxide (ethylene oxide) reaction products of higher fatty acids are well known as well as of fatty acid esters, including ethylene oxide reaction products of fatty acid esters of anhydrosorbitols. Lauric, palmitic, oleic, and stearic acids are commonly used for such esters which may generally be referred to as polyoxyalkylene derivatives of hexitol anhydride partial long chain fatty acid esters. The hexitol is usually sorbitol. Other non-ionic agents include phosphoric acid esters of polyethylene glycol; low order condensation products of alkylene oxides with esters of polyhydric alcohols and polybasic soluble acids, such as glycol tartrate and glycerol stearate further esterified with stearic acid; alkylene oxide condensation products of higher fatty acid reaction products with alkylolamines such as coconut fatty acids with diethanolamine; saponins; etc.

Not all non-ionic surfactants are equivalents in the process of the invention. It has been found that a number of non-ionic surfactants are considerably superior to others which have been carefully screened. These most effective compounds represent a common class of surfactants within special limitations as follows:

(1) They are all non-ionic polyethylene oxide ethers or thioethers.

(2) The average ethylene oxide chain length at the hydrophilic end is in the range of about 4 to 6.5 moles, with a single terminal hydroxyl group.

(3) The effectiveness of the surfactant in this particular application depends upon the length of the ethylene oxide chain as well as the overall length of the molecule.

(4) The hydrophobic (oleophilic) portion of the molecule may be either straight chain or branched hydrocarbons which may also be linked to the ethylene oxide portion through a phenolic ring, including the octyl and nonylphenols.

Certain polyethylene oxide ethers and thioethers listed below are commercially available and are especially effective in the process of the invention:

$C_{12}H_{25}(OCH_2-CH_2)_5OH$ _____ (polyethylene oxide (4) lauryl ether)

$C_{16}H_{33}(OCH_2-CH_2)_2OH$ _____ (polyethylene oxide (2) cetyl ether)

Tall Oil—$(OCH_2-CH_2)_6$ _____ (tall oil polyethylene oxide (6) ether)

$C_{12}H_{25}(OCH_2-CH_2)_{4.5\ ave}OH$ __ (polyethylene oxide (4.5) lauryl ether)

$C_xH_yS(CH_2-CH_2-O)_n-CH_2CH_2OH$ _____ (polyethylene oxide thioether)

$CH_3-CH_2-CH_2CH_2-CH-CH_2-CH-CH-CH_2(OCH_2-CH_2)_nOH$
                          |         |    |
                         $CH_3$   $CH_3$ $CH_3$ (2,3,5-trimethylnonyl polyethylene oxide ether)

To demonstrate the effectiveness of the invention with dead bacteria and yeast cells, aqueous slugs were made up of Igepal CO 530 supplied by Antara and further identified as nonylphenoxypolyethanol having an average chain length on the hydrophilic end of about 6 to 6.5 moles. Sufficient Igepal CO 530 was added to distilled or 5 weight percent brine (reconstituted formation brine) to provide a concentration of 0.06 weight percent of the surfactant and 250 ml. portions were separated for suspending dead yeast cells and dead bacteria cells therein. The selected bacteria cells were *Pseudomonas aeruginosa* of Family #1 of Order #2, pseudomonadaceae. The yeast species selected was *Candida lipolytica* of Family #4 of the torulopsidaceae of the order saccharomycetales. The concentration of the dead cells in each 250 ml. sample was approximately 0.1 weight percent.

Tests were conducted in both microcells and sand discs. The microcells were each made from two 3″ x 1″ standard slides with a space of 15 mils between them. The spacing was established by a flat polyethylene bar 15 mols thick and 1/16″ wide. The slides were glued together at the edges with epoxy resin. The 15 mil space was filled with Burbank oil-wet sand and the fluids were injected at one end thru a hypodermic needle and were produced thru the other end thru a hypodermic needle. In order to provide uniform flow over the cross section of the microcells, distribution bars 10 mils thick were positioned at both ends of the sand. The pore volume of the cells was approximately 0.5 cc.

The two prepared solutions containing the dead cells and surfactant were each injected into separate microcells packed with Burbank sand and injection was continued until breakthru. In the bacteria test, approximately 30 percent of the residual oil in the sand in the microcell was produced with no plugging, while with the yeast cells, approximately 20 percent of the residual oil was produced and no plugging occurred.

The discs used in the tests were formed by casting a section of core of Burbank sand 1¼″ in diameter in epoxy resin and the casting was sawed with a diamond saw into ⅛″ discs having a 1¼″ core section surrounded by an annular section of epoxy resin. The disc was positioned in a standard millipore filter apparatus attached to a vacuum funnel and the disc was sealed between the filter and a graduated cylinder open to the sand core of the disc so that liquid introduced to the graduated cylinder could be passed thru the sand core and filter into the vacuum flask. The selected slug to be tested was introduced to the cylinder and the vacuum was applied.

In the disc tests with Burbank sand, the penetration rates of both the bacteria and yeast slugs was at least as fast or slightly faster thru the disc than fresh water containing no surfactant or dead cells.

The foregoing tests demonstrate the effectiveness of dead bacteria and yeast cells in producing oil from an oil-bearing stratum without plugging. This is surprising in view of the size of the cells. The bacteria cells tested had an average diameter of about 0.5 micron and were about 1.5 microns in length and had the shape of slightly curved rods. The yeast cells had about the same diameter and were slightly shorter in length than the bacteria cells and were not noticeably arcuate. The ease with which the dead cells were forced thru the sand may be attributable to the effect of the surfactant and/or to the resiliency of the cells which may allow deformation in passing thru some of the smaller pores in the stratum. However, regardless of the theory which might be utilized to explain the action of the dead cells, they are effective as carriers for surfactants of non-ionic character in an aqueous slug for displacing oil from an oil-bearing sand or rock.

The aqueous solution of surfactant carrying dead cells may be injected as a slug, added continuously in an injected stream of water or intermittently into an injected aqueous stream using maximum concentrations within the ranges identified. However, the preferred technique comprises injecting a sizable slug of the aqueous solution of suspended cells and driving the slug thru the stratum to displace oil therefrom.

If the oil-bearing stratum contains salt water at a concentration in excess of 5 weight percent of salt, it is necessary to inject a substantial slug of fresh water prior to the injection of the aqueous slug of surfactant and carrier cells in order to prevent counter-acting of the surfactant by the sodium chloride in the brine or salt solution which usually causes plugging of the stratum or substantially reducing the permeability thereof. The amount of injected fresh water slug should be sufficient to provide a buffer zone between the injected surfactant slug and the connate water (brine). An amount of at least 1/10 pore volumes and up to 2 or 3 pore volumes of fresh water will adequately protect the injected slug of surfactant and suspended carrier cells from the brine.

Another manner of operation comprises treating the dead cells to be used in the injection step with sufficient surfactant for the desired concentration and then dispersing the treated particles in the fresh water to be used in the aqueous slug or aqueous drive.

As the dead cells of bacteria and/or yeast utilized in the process are carried into and thru the stratum by the aqueous slug, the absorbed surfactant slowly desorbs and becomes distributed on the rock or said particles in the stratum. This adsorption effectively displaces oil by water-wetting the reservoir rock or sand or by similar technique. At the same time, the injected particels desorb oil which often tends to adhere tenaciously to rock or sand surfaces even under detergent water flood conditions. In this manner, the injected cells augment the sweep effect of the fluid displacement action.

One source of dead bacteria comprises residual material obtained from live bacteria dewaxing of hydrocarbons. This material contains dead bacteria such as pseudonomas strain 1 which are which are oil coated and may be introduced to the surfactant solution in the selected concentration for injecting into the stratum to be produced. Dead bacteria from any live bacteria dewaxing process are utilizable in this manner and provide a relatively cheap source of dead bacteria cells.

Certain modifications of the invention will become apparent to those skilled in the art and the illustrative details discolsed are not to be construed as imposing unnecessary limitations on the invention.

I claim:
1. A process for producing oil from an oil-bearing stratum comprising the steps of:
   (1) injecting into said stratum thru a well therein an aqueous slug containing a non-ionic surfactant in solution therein in a concentration in the range of about 0.001 to 2.5 weight percent and dead cells selected from the group consisting of bacteria and yeasts in a concentration in the range of about 0.01 to 0.5 weight percent, said surfactant being selected from the group consisting of polyethylene oxide ethers and thioethers having an average chain length on the hydrophilic end in the range of about 4 to 6.5 moles;
   (2) driving the slug of (1) into said stratum away from said well so as to displace oil from a section of said stratum;
   (3) driving the displaced oil into a well in said stratum; and
   (4) producing the oil from last said well.
2. The process of claim 1 wherein said stratum contains connate salt water in a concentration exceeding 5 weight percent salt and including the step of injecting a substantial slug of fresh water prior to step (1) to form a buffer zone intermediate the salt water and the injected slug.

3. A process for producing oil from an oil-bearing stratum penetrated by an injection well and production well comprising the steps of:
   (1) injecting thru said injection well into said stratum an aqueous slug containing a non-ionic surfactant in solution therein in a concentration in the range of about 0.001 to 2.5 weight percent and dead cells selected from the group consisting of bacteria and yeasts in a concentration in the range of 0.01 to 0.5 weight percent, said surfactant being selected from the group consisting of polyethylene oxide ethers and thioethers having an average chain length on the hydrophilic end in the range of about 4 to 6.5 moles;
   (2) driving the slug of (1) into said stratum toward said production well so as to displace oil into said production well; and
   (3) producing the oil from said production well.
4. The process of claim 3 wherein said cells are principally bacteria cells.
5. The process of claim 3 wherein said cells are principally yeast cells.
6. The process of claim 3 wherein said surfactant is a nonylphenoxypolyethanol having an average chain length on the hydrophilic end in the range of about 4 to 6.5 moles.
7. The process of claim 6 wherein said cells are bacteria cells.
8. The process of claim 6 wherein said cells are yeast cells.
9. The process of claim 3 wherein said stratum contains connate salt water and including the step of injecting a substantial slug of fresh water prior to step (1) to form a buffer zone intermediate the salt water and the injected slug.
10. A process for reducing the permeability of an oil-bearing stratum which comprises the steps of:
   (1) injecting into said stratum thru a well therein an aqueous slug containing a non-ionic surfactant in solution therein in a concentration in the range of about 0.001 to 2.5 weight percent and dead cells selected from the group consisting of bacteria and yeasts in a concentration in the range of about 0.01 to 0.5 weight percent, said surfactant being selected from the group consisting of polyethylene oxide ethers and thioethers having an average chain length on the hydrophilic end in the range of about 4 to 6.5 moles; and
   (2) contacting the injected slug of step (1) in a selected area of said stratum with salt water so as to cause precipitation of a substantial portion of said dead cells, thereby decreasing the permeability of said stratum in the selected area.

References Cited

UNITED STATES PATENTS

| | | | |
|---|---|---|---|
| 2,259,419 | 10/1941 | Hefley et al. | 166—38 |
| 2,907,389 | 10/1959 | Hintzman | 166—8 |
| 2,965,172 | 12/1960 | Da Roza | 166—42 |
| 2,975,835 | 3/1961 | Bond | 166—42 |
| 3,185,216 | 5/1965 | Hintzman | 166—42 |
| 3,198,268 | 8/1965 | Lindblom et al. | 175—72 |
| 3,199,588 | 8/1965 | Holbert | 166—10 X |

FOREIGN PATENTS 654,809  12/1962  Canada.

CHARLES E. O'CONNELL, Primary Examiner.

STEPHEN J. NOVOSAD, Examiner.